US008265063B2

(12) United States Patent
Izumi

(10) Patent No.: US 8,265,063 B2
(45) Date of Patent: Sep. 11, 2012

(54) TRANSMISSION SYSTEM

(75) Inventor: Futoshi Izumi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1232 days.

(21) Appl. No.: 11/503,158

(22) Filed: Aug. 14, 2006

(65) Prior Publication Data

US 2007/0223496 A1 Sep. 27, 2007

(30) Foreign Application Priority Data

Mar. 24, 2006 (JP) .................................. 2006-81879

(51) Int. Cl.
*H04L 12/66* (2006.01)
(52) U.S. Cl. ................ 370/352; 370/392; 370/503
(58) Field of Classification Search ............ None
See application file for complete search history.

(56) References Cited

U.S. PATENT DOCUMENTS

| 5,809,022 | A * | 9/1998 | Byers et al. | 370/395.51 |
|---|---|---|---|---|
| 6,396,829 | B1 * | 5/2002 | Witschorik | 370/352 |
| 6,560,219 | B1 * | 5/2003 | Tabu et al. | 370/352 |
| 6,798,784 | B2 * | 9/2004 | Dove et al. | 370/463 |
| 6,865,179 | B1 | 3/2005 | Cao | |
| 6,920,156 | B1 * | 7/2005 | Manchester et al. | 370/522 |
| 7,471,696 | B2 * | 12/2008 | Hershey et al. | 370/466 |
| 7,719,981 | B2 * | 5/2010 | Ghanma et al. | 370/235 |
| 8,189,571 | B2 * | 5/2012 | Mizutani et al. | 370/355 |
| 2002/0016852 | A1 | 2/2002 | Nishihara | |
| 2002/0191588 | A1 | 12/2002 | Personick | |
| 2005/0053053 | A1 | 3/2005 | Smith et al. | |
| 2006/0083271 | A1 * | 4/2006 | Lim et al. | 370/535 |

FOREIGN PATENT DOCUMENTS

| EP | 0 528 206 | 2/1993 |
|---|---|---|
| EP | 0 957 603 | 11/1999 |
| JP | 54-29504 | 3/1979 |
| JP | 63-287294 | 11/1988 |
| JP | 64-018336 | 1/1989 |
| JP | 64-64439 | 3/1989 |
| JP | 2-131047 | 5/1990 |
| JP | 05-037560 | 2/1993 |
| JP | 2001-168880 | 6/2001 |
| JP | 2003-324453 | 11/2003 |

OTHER PUBLICATIONS

Yeali Sun et al., "SFPA: A Synchronous Fast Packet Switching Architecture for Very High Speeds", INFOCOM '89. Proceedings of the Eighth Annual Joint Conference of the IEEE Computer and Communications Societies. Technology: Emerging or Converging, IEEE Comput. Soc. PR, Apr. 23, 1989, pp. 641-646.

(Continued)

*Primary Examiner* — Michael J Moore, Jr.
(74) *Attorney, Agent, or Firm* — Staas & Halsey LLP

(57) ABSTRACT

A transmission system is provided which multiplexes and transmits synchronous data and asynchronous data, while maintaining the communication quality required of synchronous data and of asynchronous data respectively. A tag having information used to identify the data as synchronous data or as asynchronous data is added to both synchronous data and to asynchronous data. Tags added to each data item are extracted, and based on the information contained in the tag, each data item is identified as synchronous data or as asynchronous data, and synchronous data is transferred to a time-division switch, while asynchronous data is transferred to a packet switch.

5 Claims, 16 Drawing Sheets

OTHER PUBLICATIONS

Partial European Search Report, mailed Dec. 15, 2006, and issued in corresponding European Patent Application No. 06017343.2-2415.
Extended European Search Report, mailed Feb. 12, 2007, and issued in corresponding European Patent Application No. 06017343.2-2415.
Notification of Reason for Rejection for Japanese Patent Application No. 2006-081879; issued Mar. 2, 2011.
Japanese Office Action issued Aug. 16, 2011 in corresponding Japanese Patent Application 2006-081879.
Japanese Office Action issued Oct. 5, 2010 in corresponding Japanese Patent Application 2006-081879.

* cited by examiner

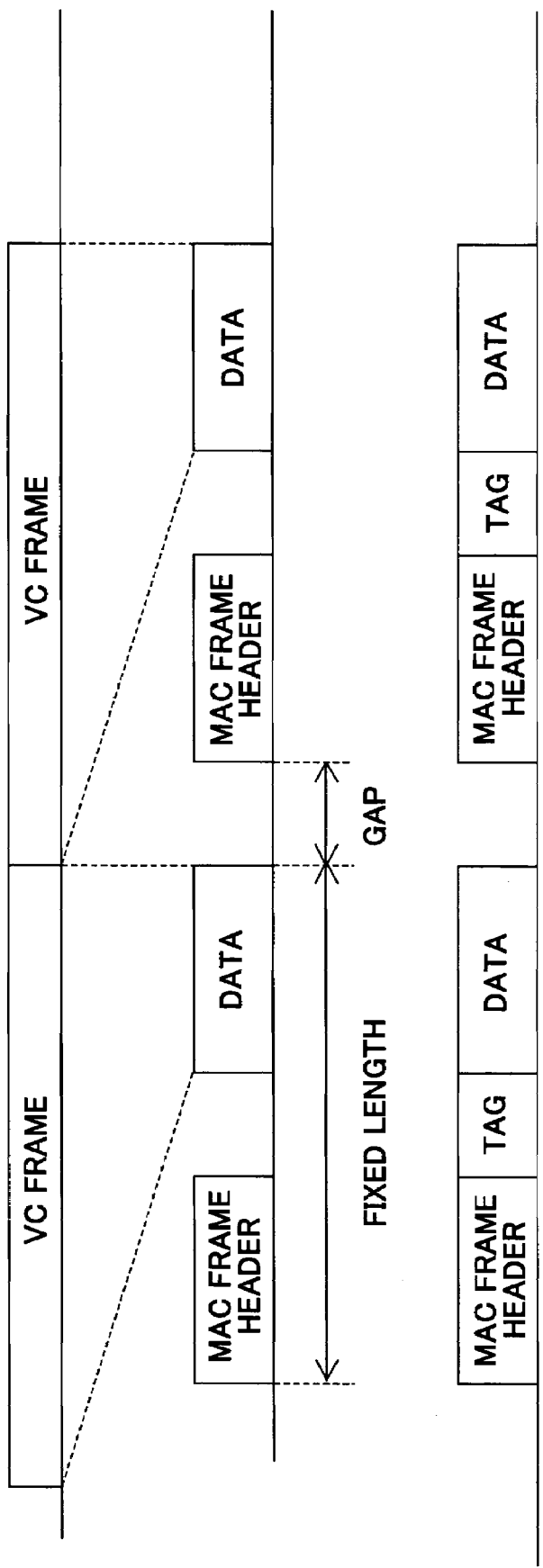

TRANSMISSION SYSTEM

CROSS-REFERENCE TO RELATED APPLICATIONS

This application is based upon and claims the benefit of priority from the prior Japanese Patent Application No. 2006-81879, filed on Mar. 24, 2006, the entire contents of which are incorporated herein by reference.

BACKGROUND OF THE INVENTION

1. Field of the Invention

The present invention relates to a transmission system capable of accommodating both a synchronous communication system such as SONET/SDH and an asynchronous communication system such as TCP/IP, and in particular relates to a transmission system which is capable of transmitting synchronous-system data without transmission delays or fluctuations thereof, while maintaining path processing for asynchronous-system data.

2. Description of the Related Art

In a synchronous communication system such as SONET (Synchronous Optical NETwork)/SDH (Synchronous Digital Hierarchy), a high-speed transmission standard based on optical fiber, time-division switches multiplex synchronous data to perform routing. And in an asynchronous communication system such as TCP/IP, packet switches switch packets, which are asynchronous data units, to different destinations. For synchronous data the same destination is always specified and circuits are occupied, but for asynchronous data (packets) the destination of each packet is specified, and circuits are not occupied. Further, synchronous data is required to have a constant delay time, but in the case of asynchronous data, adjustment is performed on the end-user side even when there is fluctuation in delay times, so that no problems arise.

When implementing communication in which the two types of data, which are synchronous data and asynchronous data, are intermixed, in the past the following methods have been proposed. A first method of the prior art is a method in which asynchronous data is all converted into a frame format of synchronous data, and all data is handled as synchronous data; a second method of the prior art is a method in which, in contrast to the first method, all synchronous data is converted into an asynchronous data format, and all data is handled as asynchronous data.

FIG. 1 shows a transmission system with a ring configuration. The ring-shape transmission path 1 is a high-speed data transmission path such as SONET/SDH or 10-Gigabit Ethernet (a registered trademark); in FIG. 1, a framer 10 (hereafter sometimes called a "node" on the transmission path) to synchronized transmitted data into prescribed frames is connected in the ring-shape transmission path 1. The high-speed transmission path 1 is not limited to a ring shape, but may have a mesh shape or another network configuration.

The framer 10 comprises a reception unit 11, which receives data transmitted on the bidirectional transmission path 1, and a transmission unit 12, which transmits data on the transmission path. The reception unit 11 is an optical-electrical conversion unit which converts received optical signals into electrical signals. The transmission unit 12 is an electrical-optical conversion unit which converts electrical signals into optical signals, which are transmitted. The frame synchronization and OH processing unit 13 drops all received data to a path selection processing unit (switch) 20, and the path selection processing unit (switch) 20 extracts data addressed to its station, and transfers the data to the low-speed interface 30. The path selection processing unit 20 transfers data addressed to other stations and added from the low-speed interface 30 to the frame synchronization and OH processing unit 13. The frame synchronization and OH processing unit 13 synchronizes transmitted data in frames according to the transmission specifications of the ring transmission path, and processes monitoring control information contained in the overhead (OH).

FIG. 2 shows an example of the configuration of a transmission system for the case in which asynchronous data is converted into synchronous data and transmitted (the first method of the prior art). The configuration example of FIG. 2 shows the configuration of the dashed-line units in FIG. 1. Synchronous data is handled, and so the path selection processing unit 20 is a time-division switch 20B.

When the synchronous data is SONET/SDH VC (Virtual Container) frames, asynchronous data, which is for example a MAC frame, must be converted into synchronous data VC frames, as shown in FIG. 2; the MAC→VC frame conversion unit 31A of the low-speed interface 30A on the side of the asynchronous communication system converts variable-length MACs frame into fixed-length VC frames, and transmits the result as synchronous data to the time-division switch 20B. VC frames are time-division multiplexed and sent to the framer 10. When the transmission specification of the ring transmission path 1 is also SONET/SDH, the synchronous data is transferred to the time-division switch 20 as-is, without frame conversion by the low-speed interface 30B on the synchronous communication system side, and after frame synchronization by the framer 10, is transmitted to the transmission path 1.

The time-division switch 20B extracts data addressed to its own station from all the synchronous data (including frame-converted asynchronous data) dropped from the framer 10, and based on the data destinations, outputs the data in the destination directions on the low-speed side. Of the extracted synchronous data, that data converted from asynchronous data is output to the low-speed interface 30A on the asynchronous communication system side, which is the destination direction, and the VC→MAC frame conversion unit 32B converts the received VC frames for the synchronous system back to MAC frames for the asynchronous communication system. Further, among the synchronous data addressed to its own station, synchronous data excluding the data converted from asynchronous data (data which has been synchronous data from the beginning) is transferred to the low-speed interface 30B on the synchronous communication side which is the destination direction, and is output without change as synchronous data.

This first method of the prior art performs relaying using a time-division switch (relay station) 20B, and so can minimize the transmission delay time (with a delay of one frame's worth only) and enable highly reliably relaying. However, originally it is expected that asynchronous data will have priorities assigned to packets for processing according to the type of service. That is, asynchronous data differs from synchronous data in that the need arises for relaying via integrated circuits which perform complex route processing and priority processing. Such functions cannot be incorporated into a time-division switch, and so in the end only simple functions for transferring data can be used with asynchronous data, and the advantages of asynchronous data are largely lost.

FIG. 3 shows an example of the configuration of a transmission system for a case in which synchronous data is converted into asynchronous data and transmitted (the second method of the prior art). The configuration example of FIG. 3 shows the configuration of the dashed-line units in FIG. 1. Asynchronous data is handled, and so the path selection processing unit 20 is a packet switch 20A.

As shown in FIG. 3, synchronous data must be converted into asynchronous data, and the VC→MAC frame conversion unit 32B of the low-speed interface 30B converts synchronous data, which are VC frames, into MAC frames, which are asynchronous data frames, and transfers the data as asynchronous data to the packet switch 20A. The MAC frames are subjected to statistical multiplexing, and are sent to the framer 10. The asynchronous data is transferred as-is to the packet switch 20A without frame conversion from the low-speed interface 30A of the asynchronous communication side, and are sent to the framer 10. The framer 10 synchronizes asynchronous data from the packet switch 20 in frames according to the transmission specification of the ring transmission path (for example, LAN PHY), and transmits the data.

The packet switch 20A extracts data addressed to its own station from all the asynchronous data (including frame-converted synchronous data) dropped from the framer 10, and based on the destinations of the data, outputs the data in the low-speed side destination directions. Of the extracted asynchronous data addressed to its own station, that converted from synchronous data is output to the low-speed side interface 30B of the synchronous communication system, which is the destination direction, and the MAC→VC frame conversion unit 32A returns the received MAC frames for asynchronous communication into VC frames for synchronous communication and outputs the frames. Of the asynchronous data addressed to its own station, the asynchronous data excluding that converted from synchronous data (data which had been asynchronous data from the beginning) is transferred to the low-speed side interface 30A of the asynchronous communication side, which is the destination direction, and output as-is as asynchronous data.

Because packet switching is used in this second method of the prior art, the advantages of asynchronous data in the above first method of the prior art can be utilized; but because even synchronous data is transferred by packet switching, there are always fluctuations in the transfer time of synchronous data. Further, because of the complexity of relay processing, reliability is reduced, and in addition this method effectively entails storage communication, so that transmission delay times tend to be large.

In the configuration of this second method of the prior art, processing of synchronous data as top-priority packets is conceivable as a method of minimizing the delay time for synchronous data. However, if this method is used, all unrelated top-priority packets (frame-converted synchronous data) not addressed to its own station are sent to the packet switch, resulting in reduced operating capacity of the packet switch, so that the problems of sharply reduced communication speed of asynchronous data not subjected to prioritized processing and increased discarding of packets arise.

In addition, a transmission method is conceivable which employs a configuration in which a time-division switch for synchronous data and a packet switch for asynchronous data are positioned in parallel (hereafter called a third method of the prior art).

FIG. 4 shows an example of the configuration of a transmission system for the case in which synchronous data and asynchronous data are processed and transmitted in parallel (the third method of the prior art). The multiplexing unit 50 multiplexes synchronous data added from the time-division switch 20B and asynchronous data added from the packet switch 20A. In the ring transmission path, it is necessary to unify the frame format as either synchronous data or asynchronous data; for example, in FIG. 4, asynchronous data is converted into the frame format for synchronous data. When the synchronous data is in SONET/SDH frames, and the high-speed ring transmission path is also SONET/SDH, the synchronous data must be converted into SONET/SDH.

The frame conversion unit 60 performs frame conversion in order to cause the MAC frames, which are asynchronous data, to be compatible with the SONET/SDH format, so that synchronous data and asynchronous data can be multiplexed in the multiplexing unit 50. For example, frame conversion is performed by encapsulating MAC frames so as to enable SONET/SDH transmission, based on GFP (Generic Framing Procedure) and LCAS (Link Capacity Adjustment Scheme) methods.

Conversely, when the specifications of the ring transmission path 1 are such as to enable unmodified handling of MAC frames of asynchronous data (for example, the LAN PHY specification), the frame conversion unit 60 converts VC frames of synchronous data flowing in the transmission path direction into MAC frames, and synchronous data flowing in the direction of the low-speed side are returned from MAC frames to VC frames.

Such a third method of the prior art requires placement of both a packet switch and a time-division switch, and is disadvantageous in terms of both circuit scale and implementation efficiency; in addition, due to the different frame formats of data handled by the packet switch and the time-division switch, the following problems arise.

That is, because it is impossible to distinguish between data which is to be sent to the packet switch and data which is to be sent to the time-division switch, all the data dropped from the framer 10 must be transferred to both the packet switch and to the time-division switch. The need arises for each switch to process all data. Hence the processing load on both switches becomes excessive; in particular, the problems of the above-described second method of the prior art remain. That is, in the packet switch, the problems of greatly diminished communication speed of asynchronous data and of an increase in the discarding of packets occurs.

Japanese Patent Laid-open No. 2003-324453 discloses a transmission device which reads the arrival time order of asynchronous data from a buffer and adds a plurality of identifying tags to transmit data, to convert asynchronous data into synchronous data and perform multiplexing, transmission and reception.

Further, Japanese Patent Laid-open No. 5-37560 discloses a transmission device in which, when data equivalent to a packet length is accumulated in a transmission buffer, a time stamp based on an asynchronous clock is added and the data transmitted, so that asynchronous data can be converted into synchronous data and transmitted and received without being affected by delay fluctuations of asynchronous data. Japanese Patent Laid-open No. 2003-324453 and Japanese Patent Laid-open No. 5-37560 described inventions in which asynchronous data is converted into synchronous data and transmitted.

An object of this invention is to provide a transmission system which is capable of multiplexing and transmitting synchronous data and asynchronous data, while maintaining the communication quality required of synchronous data and of asynchronous data respectively.

SUMMARY OF THE INVENTION

A first configuration of a transmission system in one mode of the invention to attain the above objects is a transmission system, which receives from a node on the transmission path multiplexed data in which synchronous data and asynchronous data are intermixed and unified as either frames of the synchronous data or as frames of the asynchronous data, and which performs switching of the data items, and is characterized in having a first switch, which switches synchronous data; a second switch, which switches asynchronous data; and a distribution control unit, which extracts tags added to data items, and based on information included in the tags to identify whether the data is synchronous data or asynchronous data, identifies the data as synchronous data or as asynchronous data, transfers synchronous data to the first switch, and transfers asynchronous data to the second switch.

A second configuration of a transmission system in another mode of the invention is the transmission system of the first configuration, characterized in having a tag insertion unit, which inserts, into synchronous data output in the transmission path node direction from the first switch, a tag indicating that the data is synchronous data, and which inserts, into asynchronous data output in the transmission path node direction from the second switch, a tag indicating that the data is asynchronous data; and a multiplexing unit, which performs multiplexing unified as frames of either synchronous data or asynchronous data, with the tags inserted thereinto.

A third configuration of a transmission system in another mode of the invention is a transmission system, which receives from a node on the transmission path multiplexed data in which synchronous data and asynchronous data are intermixed and unified as frames of the asynchronous data, and which performs switching of the data items, and is characterized in having a packet switch, which switches asynchronous data; and a straight-through processing unit, which extracts tags added to separated data items, and based on information to identify whether the data is synchronous data or asynchronous data and destination information included in the tags, sends first data, which is synchronous data and is not addressed to the packet switch, to the node of the transmission path, and transfers second data other than the first data to the switch.

A fourth configuration of a transmission system in another mode of the invention is the transmission system of the third configuration, characterized in that the packet switch processes with priority data which is synchronous data and is the second data, and which moreover is addressed to the switch.

A fifth configuration of a transmission system in another mode of the invention is the transmission system of the third configuration, having a frame conversion unit, which converts synchronous data, output from the packet switch to a low-speed interface side, from frames of asynchronous data into frames of synchronous data, and characterized in that the frame conversion unit has memory which absorbs delay fluctuations of synchronous data output from the packet switch.

By means of this invention, highly reliable transfer of data in which are intermixed synchronous data and asynchronous data is possible, while suppressing transmission delays and fluctuations thereof for synchronous data, and while suppressing transmission delays and discarding of asynchronous data.

Further, the load on switches (on packet switches, and, when using time-division switches, on time-division switches) can be reduced.

BRIEF DESCRIPTION OF THE DRAWINGS

FIG. 7C shows synchronous data and asynchronous data with tags added;

DESCRIPTION OF THE PREFERRED EMBODIMENTS

Figure 1:
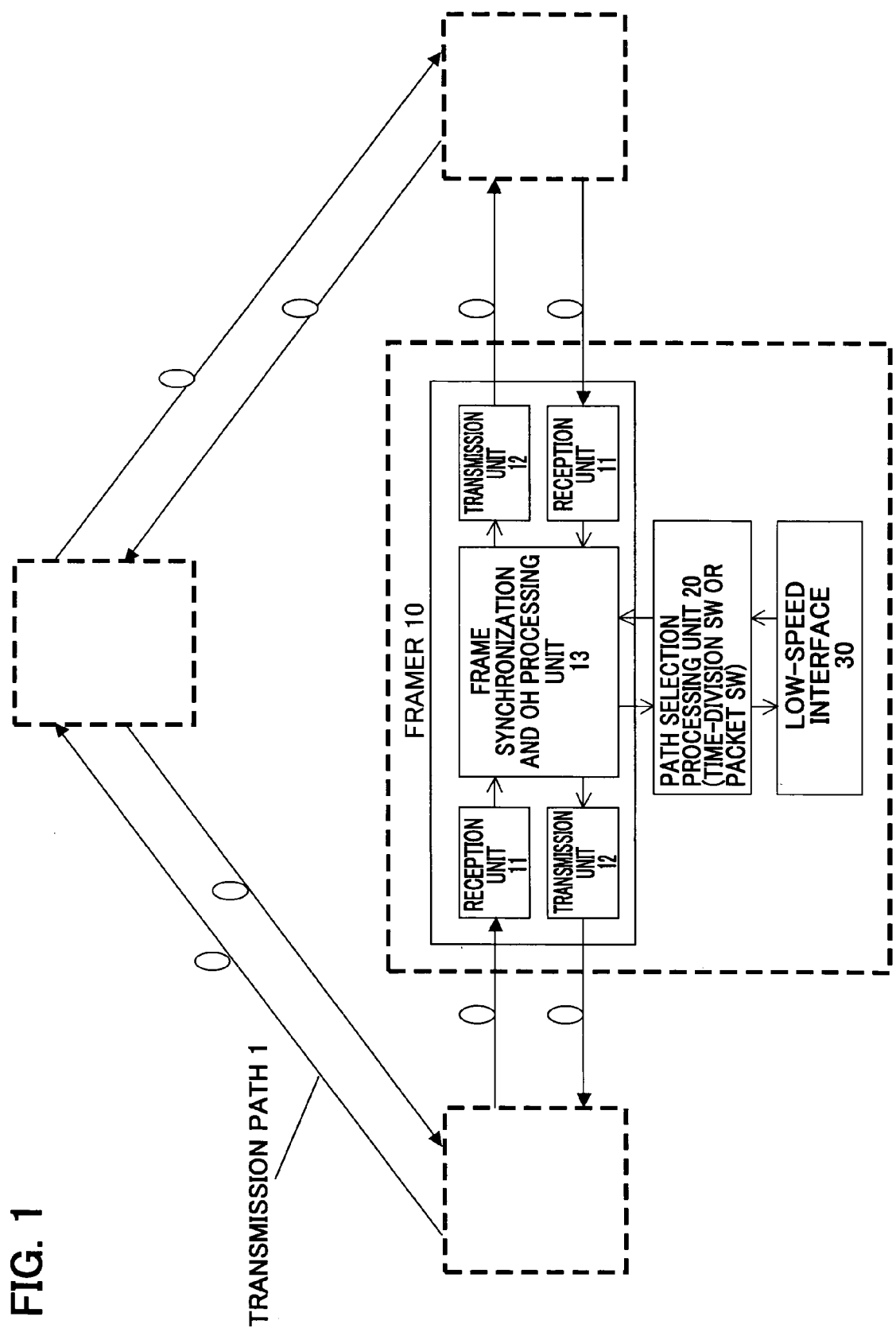
FIG. 1 shows a transmission system with a ring configuration.
Figure 2:
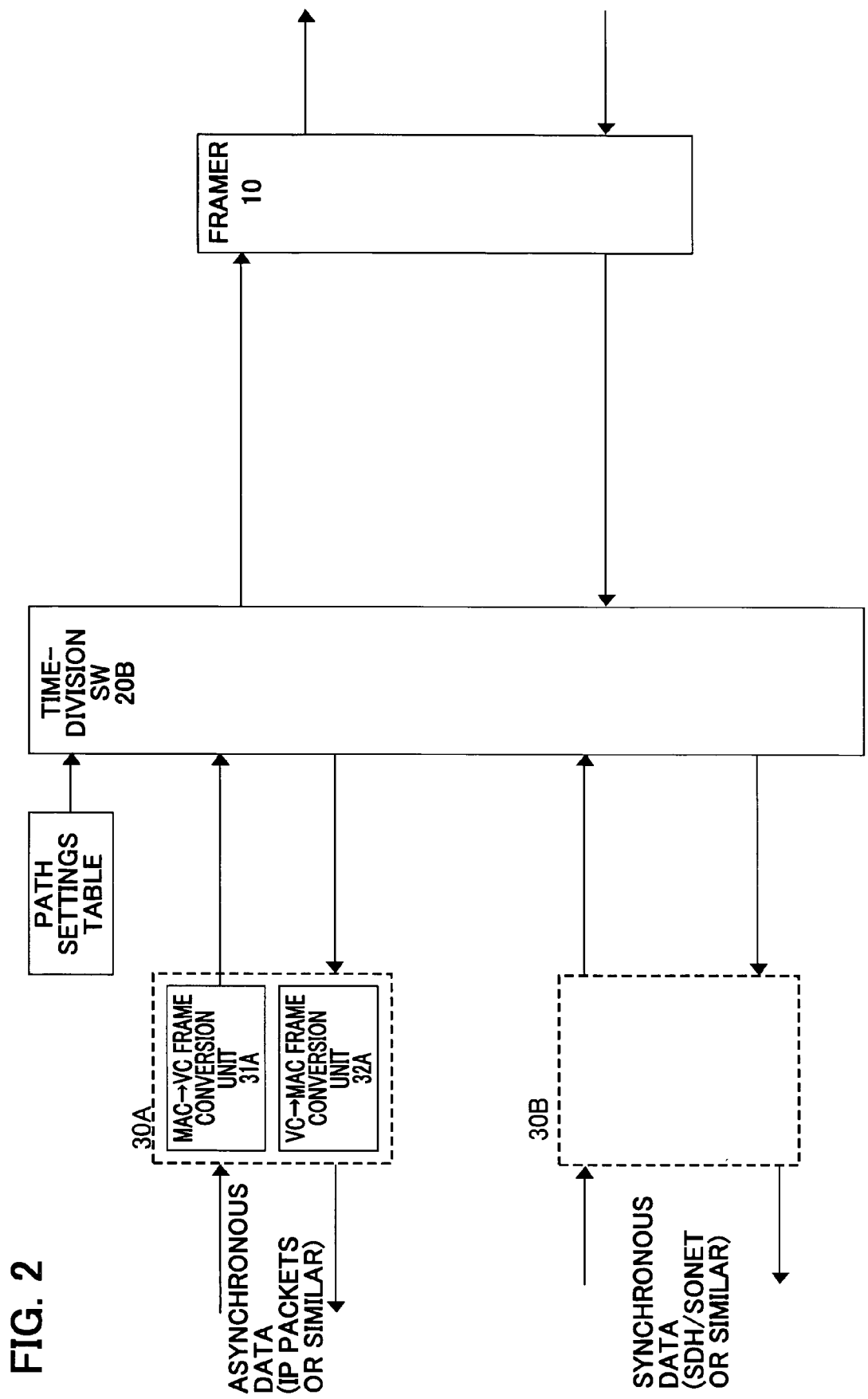
FIG. 2 shows an example of the configuration of a transmission system when converting asynchronous data into synchronous data and transmitting the data.

Below, aspects of the invention are explained referring to the drawings. However, the aspects do not limit the technical scope of the invention.

Figure 4:
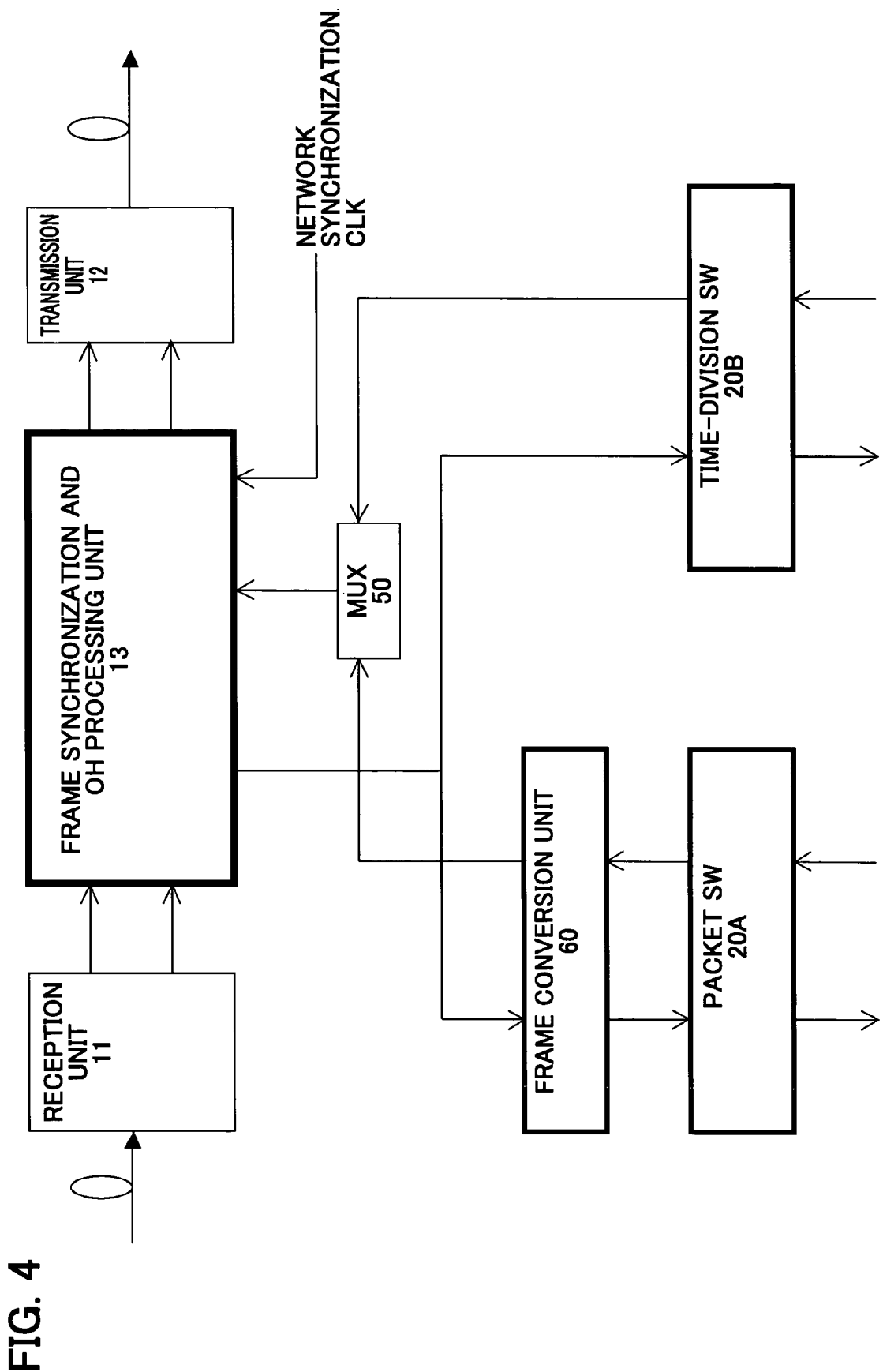
FIG. 4 shows an example of the configuration of a transmission system when separately processing and transmitting in parallel synchronous data and asynchronous data.
Figure 5:
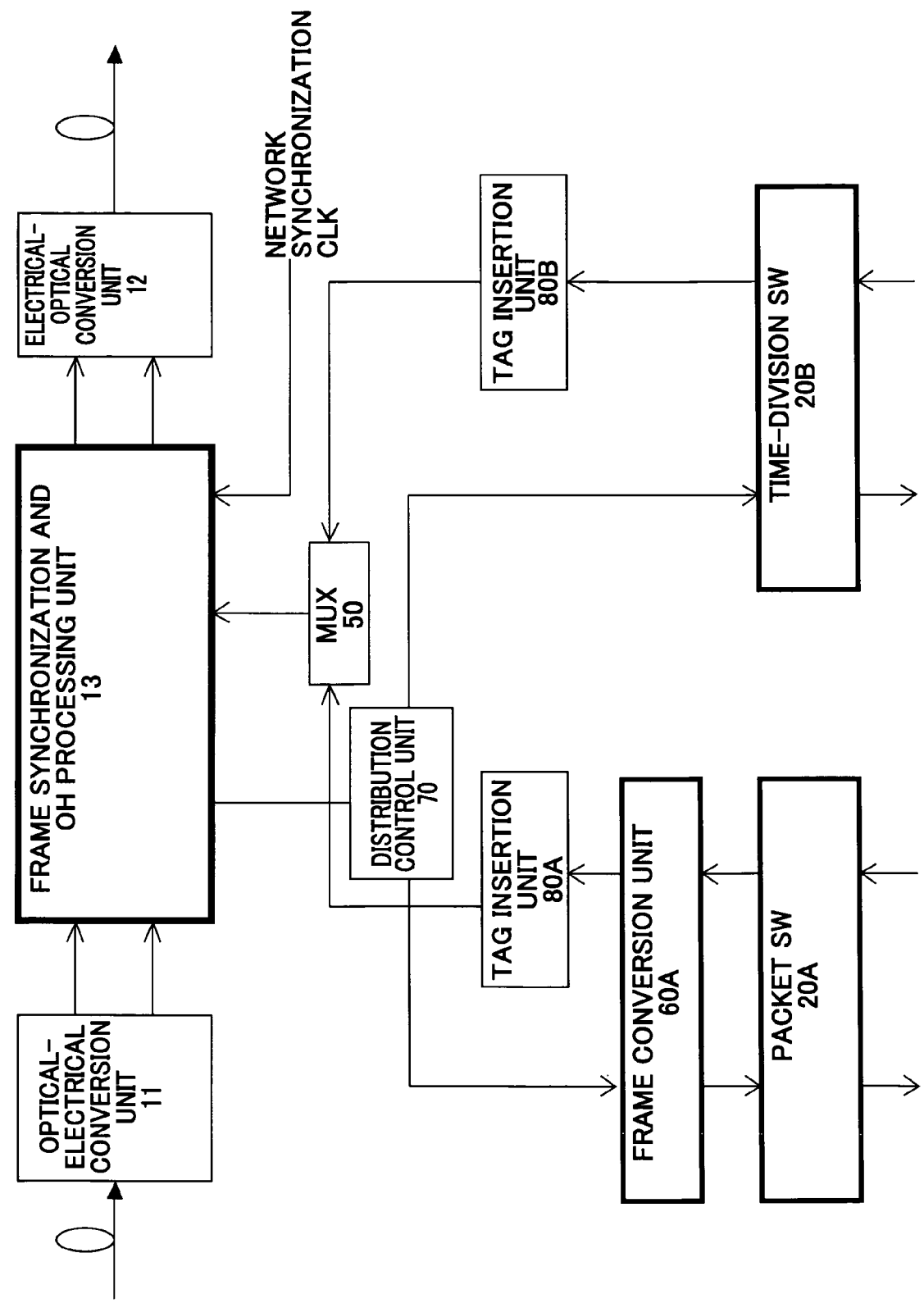
FIG. 5 shows a first configuration example of the transmission system of an aspect of the invention.

FIG. 5 shows a first configuration example of the transmission system of an aspect of the invention. This first configuration example is the configuration of FIG. 4, comprising a distribution control unit 70 and a tag insertion unit 80 (an inclusive term for the tag insertion units 80A and 80B), which are characteristic of this invention.

The packet switch 20A for asynchronous communication and the time-division switch 20B for synchronous communication are arranged in parallel, and data output from the two switches in the direction of the framer (node) 10 is multiplexed by the multiplexing unit 50 and sent to the framer 10. The frame conversion unit 60A converts frames of asynchronous data into frames of synchronous data in order to unify the asynchronous data frames and synchronous data frames as synchronous data frames. When the transmission specification of the transmission path is for example SONET/SDH, and synchronous data is also data in SONET/SDH format, the synchronous data frames are compatible with SONET/SDH format, and so there is no need for frame conversion of synchronous data. When the asynchronous data frames are MAC frames, the frame conversion unit 60 adds a VC frame header to the MAC frame to enable SONET/SDH transmission based on for example GFP (Generic Framing Procedure) and LCAS (Link Capacity Adjustment Scheme), and encapsulates the data to perform frame conversion.

Prior to multiplexing of the synchronous data and asynchronous data, the tag insertion unit 80 adds tags, having information to identify whether data is synchronous data or asynchronous data, to the synchronous data and asynchronous data.

The distribution control unit 70, upon receiving data from the framer 10 on the transmission path side, identifies the data as synchronous data or as asynchronous data based on the tag added to each data item, and transfers asynchronous data to the packet switch 20A, and transfer synchronous data to the time-division switch 20B.

In this way, prior to sending data from the framer 10 to the two switches 20, the distribution control unit 70 identifies the data as either synchronous data or as asynchronous data based on tag information, and sends only asynchronous data to the packet switch 20A; consequently the problems of reduced communication speeds for asynchronous data and of increased discarding of asynchronous data, resulting when synchronous data is sent to the packet switch 20A and is processed with priority, can be resolved. Moreover, only asynchronous data is sent to the packet switch 20A, and only synchronous data is sent to the time-division switch 20B, so that there is no sending of irrelevant data, and the load on both switches 20 can be reduced. Only synchronous data is sent to the time-division switch 20B, so that switching of synchronous data can be performed without delay fluctuations, and there is no input of irrelevant asynchronous data, so that increases in the load can be prevented.

The packet switch 20A cannot switch MAC frames transferred from the distribution control unit 70 with a tag added, and so the frame conversion unit 60 removes the tag during frame conversion. Further, the tag need not be added to the beginning of the frame, but may be added to the data area, or to a prescribed area within the header area.

Figure 6:
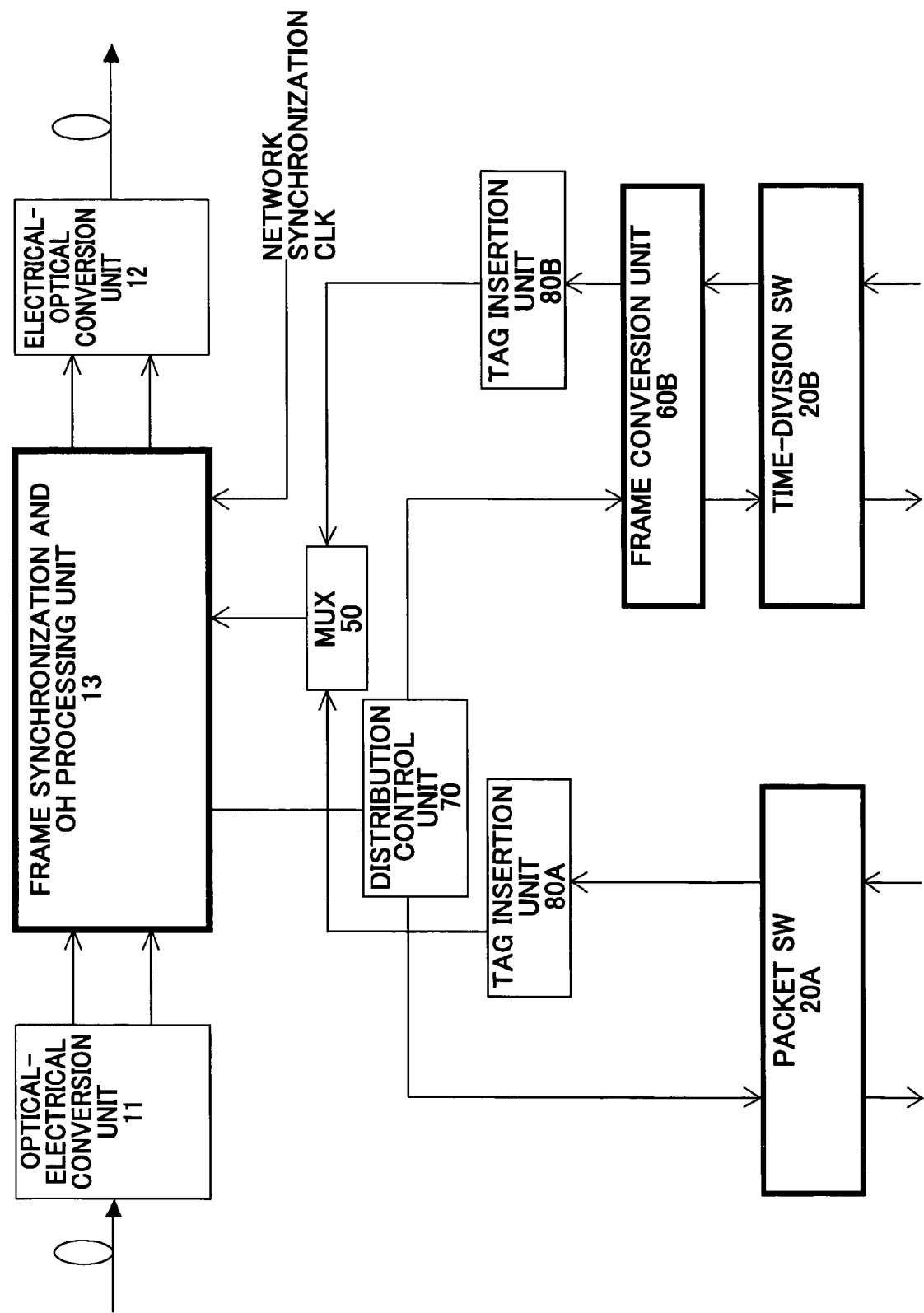
FIG. 6 shows a second configuration example of the transmission system of an aspect of the invention.

FIG. 6 shows a second configuration example of the transmission system of an aspect of the invention. The second configuration example, similarly to the first configuration example, comprises a packet switch 20A for asynchronous data and a time-division switch 20B for synchronous data placed in parallel, a tag insertion unit 80, and a distribution control unit 70. A difference with the first configuration example is that, whereas in the first configuration example the frame conversion unit 60A converts asynchronous data frames into synchronous data frames, in the second configuration example, when the transmission specification of the transmission path is a specification such as LAN PHY (10-Gigabit Ethernet (a registered trademark)) which transmits MAC frames of asynchronous data, the frame conversion unit 60B adds a MAC frame header to synchronous data frames (for example, SONET/SDH VC frames) to perform conversion into MAC frames, which are sent to the multiplexing unit 50.

As explained above, the packet switch 20A cannot switch MAC frames transferred from the distribution control unit 70 to which tags have been added, and so a tag removal unit 82 which removes tags from data input to the packet switch 20A is provided. Or, as described above, rather than adding the tag to the beginning of the frame, a tag may be written in the data area, or may be written in a prescribed area of the header area.

Figure 7A:
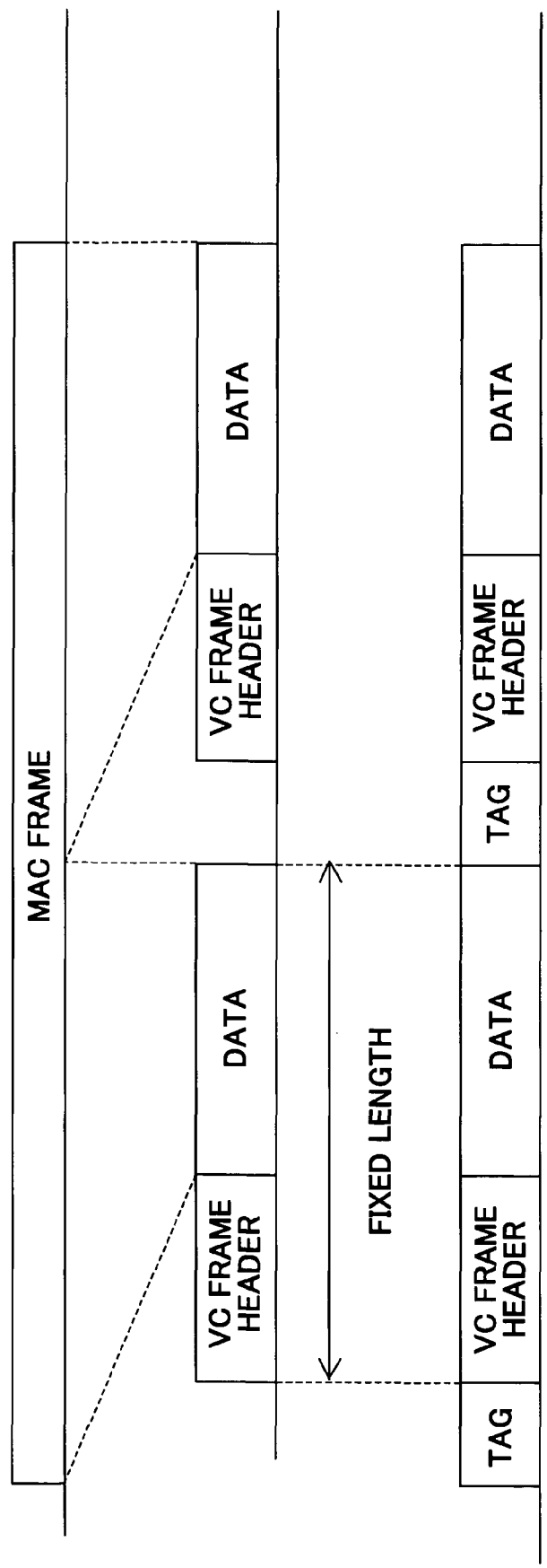
FIG. 7A shows synchronous data and asynchronous data with tags added.
Figure 7B:
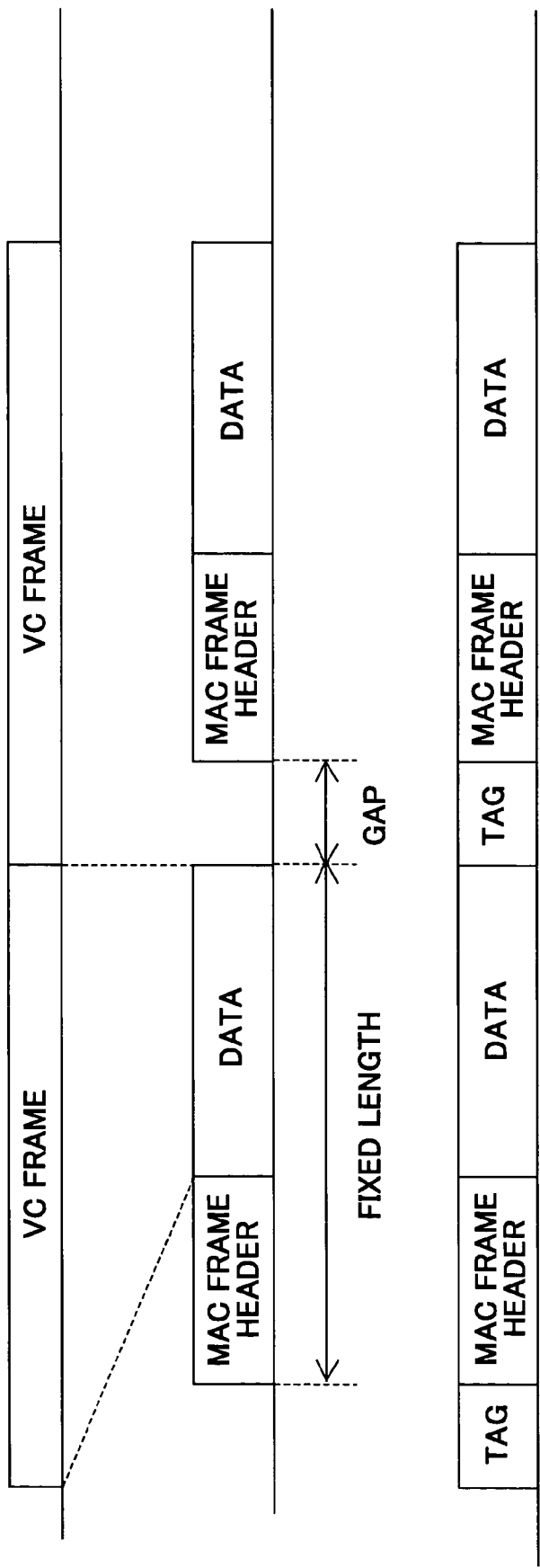
FIG. 7B shows synchronous data and asynchronous data with tags added.

FIG. 7A, FIG. 7B, and FIG. 7C show synchronous data and asynchronous data with tags added. In FIG. 7A, tags are added at the beginning of asynchronous data (MAC data) converted to synchronous data with a VC frame header added in the configuration example in FIG. 5. The tag in FIG. 7A has information indicating that the data is asynchronous. When frame conversion is not performed, a tag is added to the beginning of the MAC frame.

In FIG. 7B, a tag is added to the beginning of synchronous data (VC frames) which is frame-converted into asynchronous data with MAC frame headers added, in the configuration example of FIG. 6. The tags in FIG. 7B have information indicating that the data is synchronous data. When frame conversion is not performed, a tag is added to the beginning of the VC frame.

FIG. 7C shows synchronous data (VC frames) which is converted to asynchronous data frames with MAC frame headers added; in this example, tags are added not to the frame beginning, but to the data area.

Figure 8:
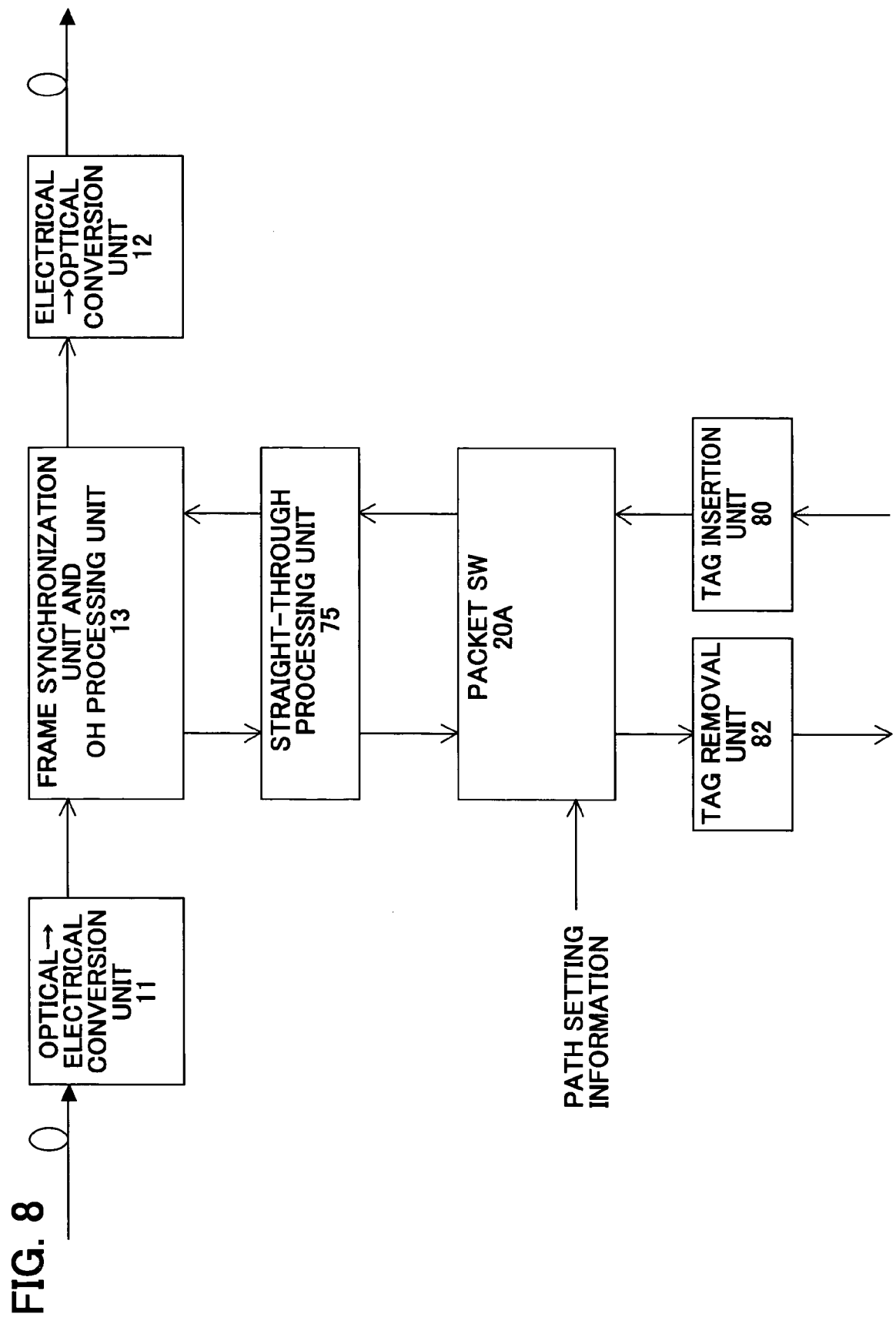
FIG. 8 shows a third configuration example of the transmission system of an aspect of the invention.

FIG. 8 shows a third configuration example of the transmission system of an aspect of the invention. In the third configuration example, the only switch is the packet switch 20A, and a time-division switch is not provided. Further, tags have destination information for each data item in addition to information to identify synchronous data and asynchronous data.

The straight-through processing unit 75, upon receiving multiplexed data from the framer 10 on the transmission path side, identifies each data item as synchronous data or as asynchronous data based on the information of the tag added to the data item, and judges whether the destination information indicates that the destination is the packet switch 20A (the station itself). That is, the straight-through processing unit 75 can classify data from the transmission path side into one of the following four data types.

(1) Synchronous data addressed to another station
(2) Synchronous data addressed to this station
(3) Asynchronous data addressed to another station
(4) Asynchronous data addressed to this station In the third configuration example, the straight-through processing unit 75 executes straight-through processing to return the synchronous data addressed to another station of (1) above from the framer 10 to the transmission path as-is, without transferring the data to the packet switch 20A. The synchronous data addressed to another station of (1) is returned as-is to the transmission path without relay processing by the packet switch 20A, so that transmission delays can be minimized, and synchronous data can be relayed similarly to the case when using a time-division switch.

On the other hand, the straight-through processing unit 75 transfers data other than (1) above, that is, (2) synchronous data addressed to this station, (3) asynchronous data addressed to another station, and (4) asynchronous data addressed to another station, to the packet switch 20A. By processing with priority as prioritized packets the data of (2), synchronous data addressed to this station, delays and fluctuations thereof can be held to a minimum.

With respect to (3) asynchronous data addressed to another station and (4) asynchronous data addressed to this station, because (1) synchronous data addressed to another station does not flow into the packet switch 20A, the load on the packet switch 20A can be reduced. In addition, the volume of synchronous data which is processed with priority is limited, and (2) synchronous data addressed to this station is always output to the low-speed side interface, so that large delays in processing of asynchronous data do not occur. Hence the asynchronous data which is (3) asynchronous data addressed to another station and (4) asynchronous data addressed to this station can also be relayed without resulting in declines in communication speed or discarded packets.

Figure 9:
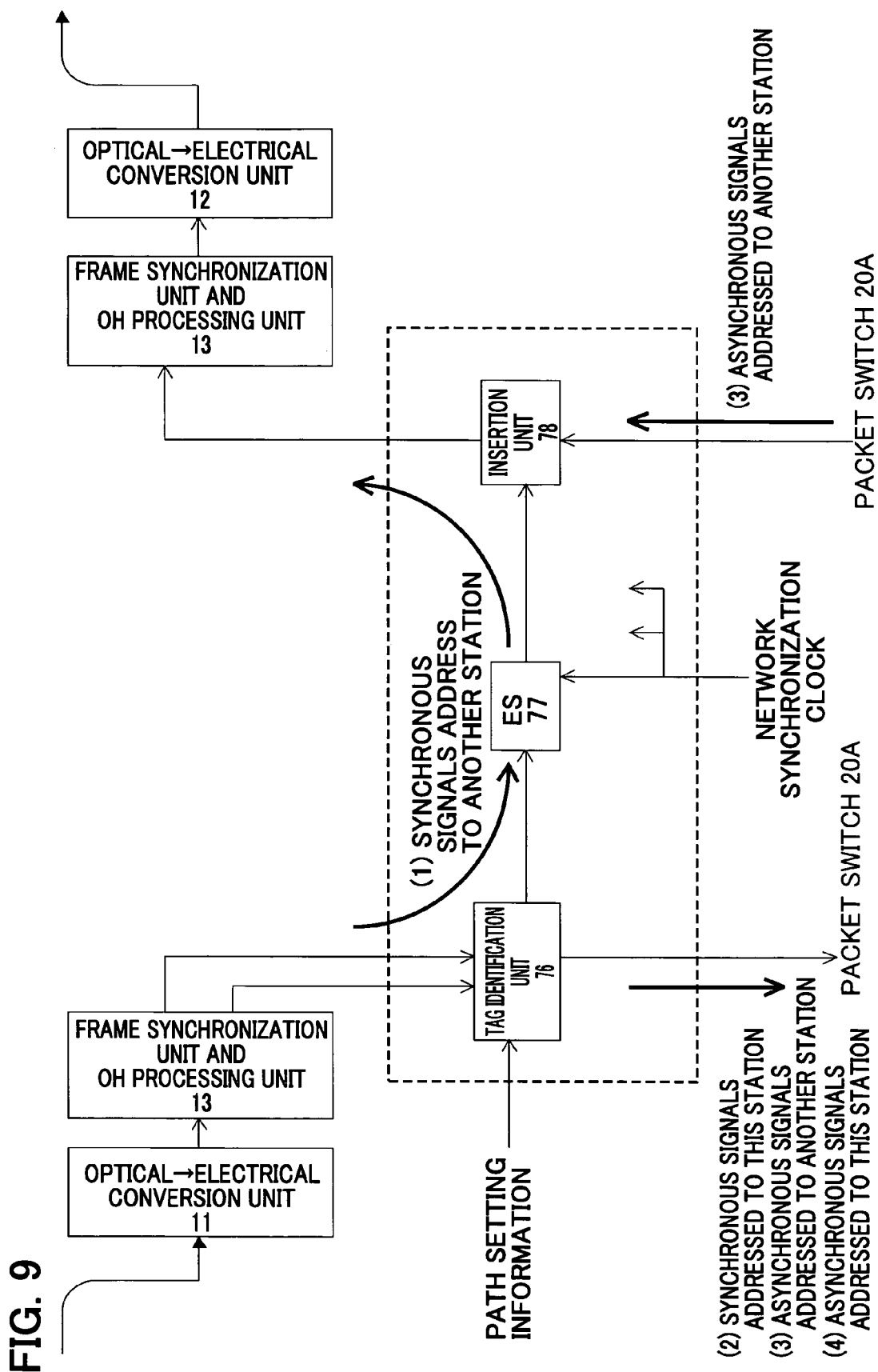
FIG. 9 shows a configuration example of a straight-through processing unit 75.

FIG. 9 shows a configuration example of the straight-through processing unit 75. The tag identification unit 76 of the straight-through processing unit 75 identifies the tag information, performs straight-through processing of data (1), and transfers all other data (2), (3) and (4) to the packet switch 20A. The elastic memory 77 is temporary accumulation memory (so-called FIFO (First-In-First-Out)) to perform phase adjustment with the network synchronization clock. The insertion unit 78 adds, to the straight-through-processed data (1), data output from the packet switch 20A to the transmission path side, comprising the data (3).

Returning to FIG. 8, the tag insertion unit 80, similarly to that in the first and second configuration examples, adds a tag, having information to identify the data as synchronous data or as asynchronous data, to the data output from the packet switch 20A in the transmission path direction. In addition, the tag insertion unit 80 in the third configuration example adds data destination information as tag information.

The tag removal unit 82 removes tags added to the data flowing into the packet switch 20A. Tags need not be removed when they are not added to the beginning of frames.

Figure 3:
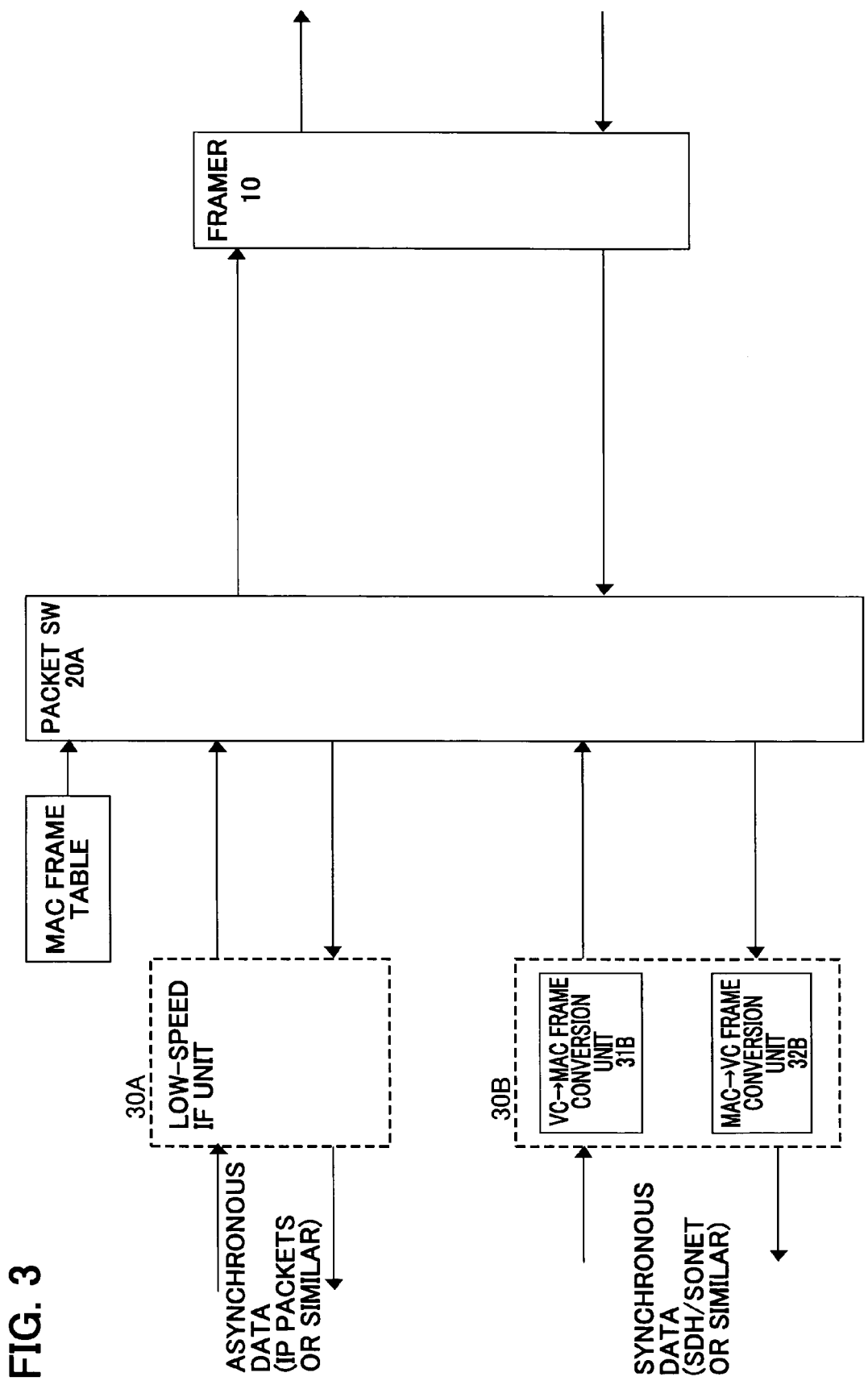
FIG. 3 shows an example of the configuration of a transmission system when converting synchronous data into asynchronous data and transmitting the data.

Although not shown in FIG. 8, in the third configuration example, synchronous data must be converted into asynchronous data frames, and as shown in FIG. 3 synchronous data frames (VC frames) at the low-speed interface 30 of the packet switch 20A are converted into asynchronous data frames (MAC frames), which flow into the packet switch 20A; and synchronous data output from the packet switch 20A to the low-speed interface 30 (the result of conversion into asynchronous data frames) is restored to synchronous data frames (VC frames).

When the transmission path conforms to transmission specifications (SONET/SDH) such that MAC frames cannot be transmitted as-is, a frame conversion unit which performs processing to convert between asynchronous data frames (MAC frames) and synchronous data frames (VC frames) is necessary between the straight-through processing unit 75 and the packet switch 20A.

In the above third configuration example, identification of synchronous signals addressed to other stations may be performed using path setting information of the synchronous data. Synchronous data occupies top-priority circuits, and in light of the fact that it is utilized in a fixed manner, there is no reduction in communication speed due to addition of tags during path management over the entire network. However, when setting paths for synchronous data, path setting information must also be set to all the switches (relay stations) involved in relaying the data.

In the above-described aspects, configuration examples of transmission systems for a bidirectional ring transmission path were described; but a network employing a bidirectional ring transmission path with redundancy may be realized as a network with enhanced reliability.

Figure 10:
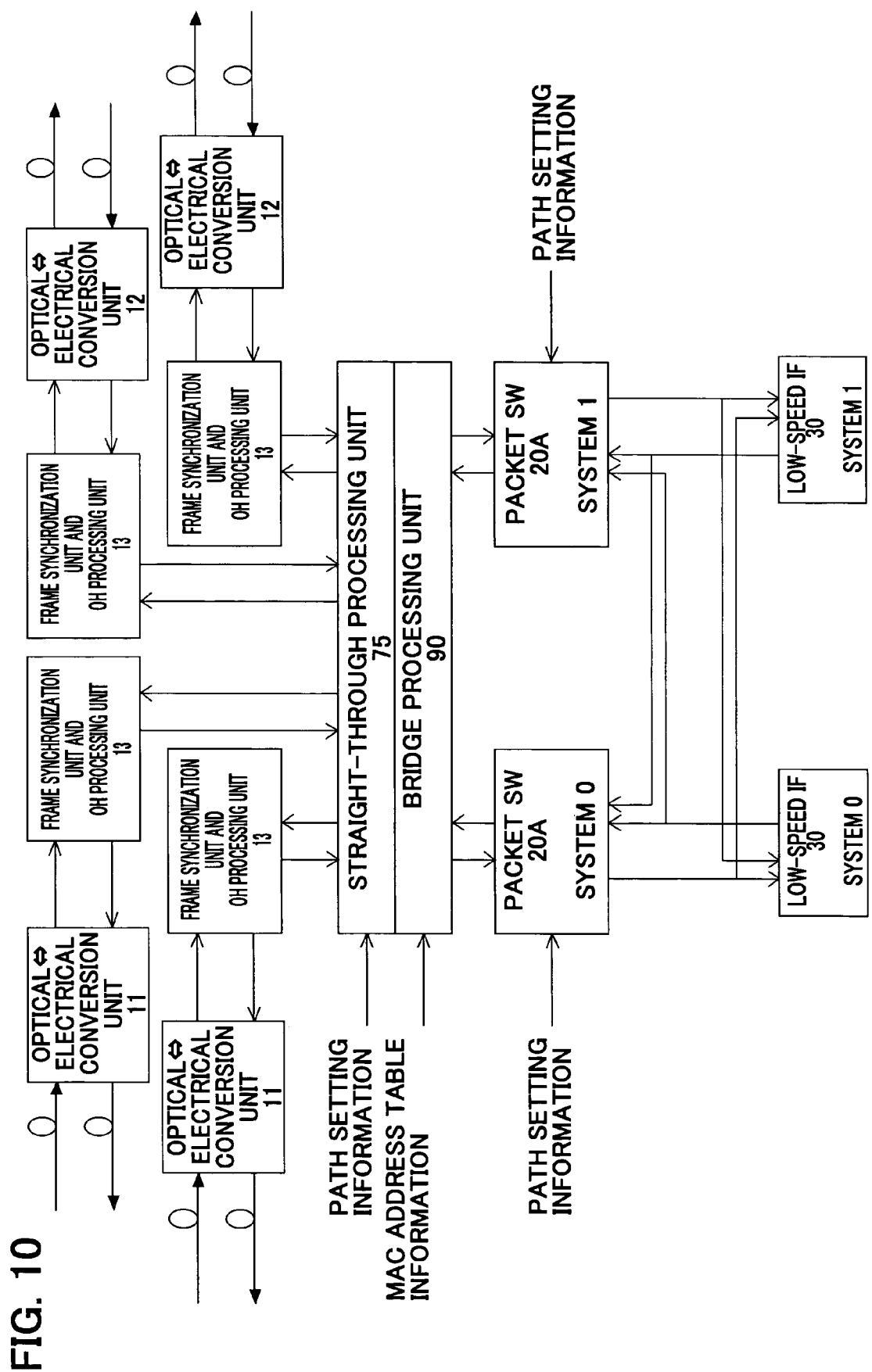
FIG. 10 shows a fourth configuration example of a transmission system of an aspect of the invention, corresponding to a network with redundancy.

FIG. 10 shows a fourth configuration example of a transmission system of an aspect of the invention, corresponding to a network with redundancy. FIG. 10 shows an example of the above-described third configuration example with redundancy added; two packet switches 20A, for system 0 and for system 1, are provided. Two low-speed interfaces 30 are also provided, for system 0 and for system 1.

The bridge processing unit 90 is a bridge circuit to transfer data from one packet switch 20A to the other packet switch 20A (from system 0 to system 1, or from system 1 to system 0). By providing the bridge processing unit 90, the operation of the two packet switches 20A can be handled as equivalent to the operation of a single packet switch 20A. Also, by combining packet switches with comparatively small capacities, the switches can be used as a large-capacity packet switch, so that the costs of initial installation can be reduced.

Figure 11:
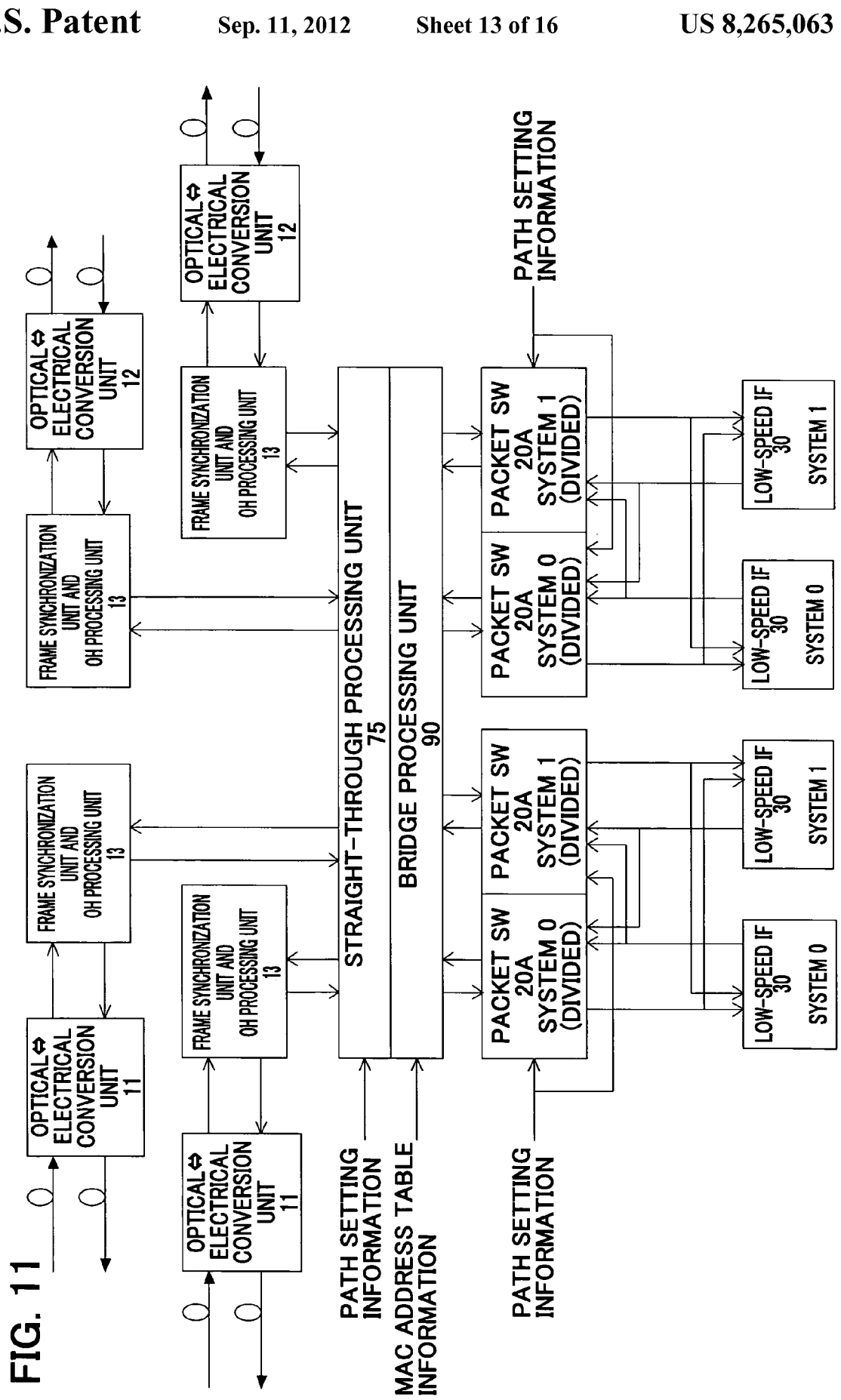
FIG. 11 shows a fifth configuration example of a transmission system of an aspect of the invention, corresponding to a network with redundancy.

FIG. 11 shows a fifth configuration example of a transmission system of an aspect of the invention, corresponding to a network with redundancy. In the fifth configuration example, similarly to the fourth configuration example, two packet switches 20A are provided to impart redundancy; in addition, each packet switch is internally divided, so that system 0 and system 1 units exist in each packet switch. By dividing packet switches as necessary, switches can be utilized efficiently.

Figure 12:
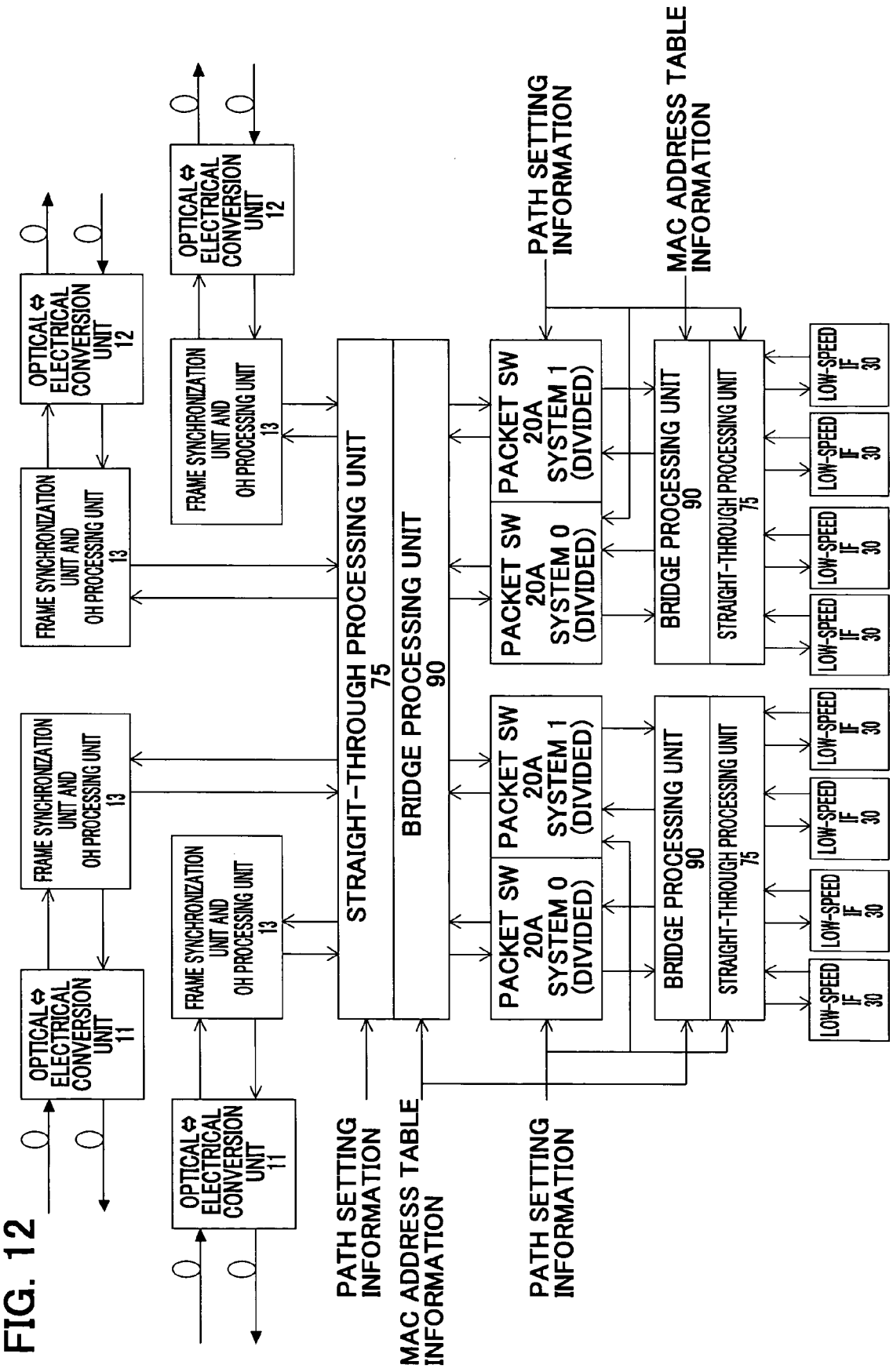
FIG. 12 shows a sixth configuration example of a transmission system of an aspect of the invention, corresponding to a network with redundancy.

FIG. 12 shows a sixth configuration example of a transmission system of an aspect of the invention, corresponding to a network with redundancy. The sixth configuration example is similar to the fifth configuration, but with a straight-through processing unit 75 and bridge processing unit 90 provided on the side of the low-speed interface 30 as well. When implementing a multilink configuration or a hairpin configuration (a configuration in which two low-speed systems directly transfer data back and forth), data from a low-speed interface 30, similarly to data from a high-speed transmission path, must be straight-through processed by a straight-through processing unit 75.

Figure 13:
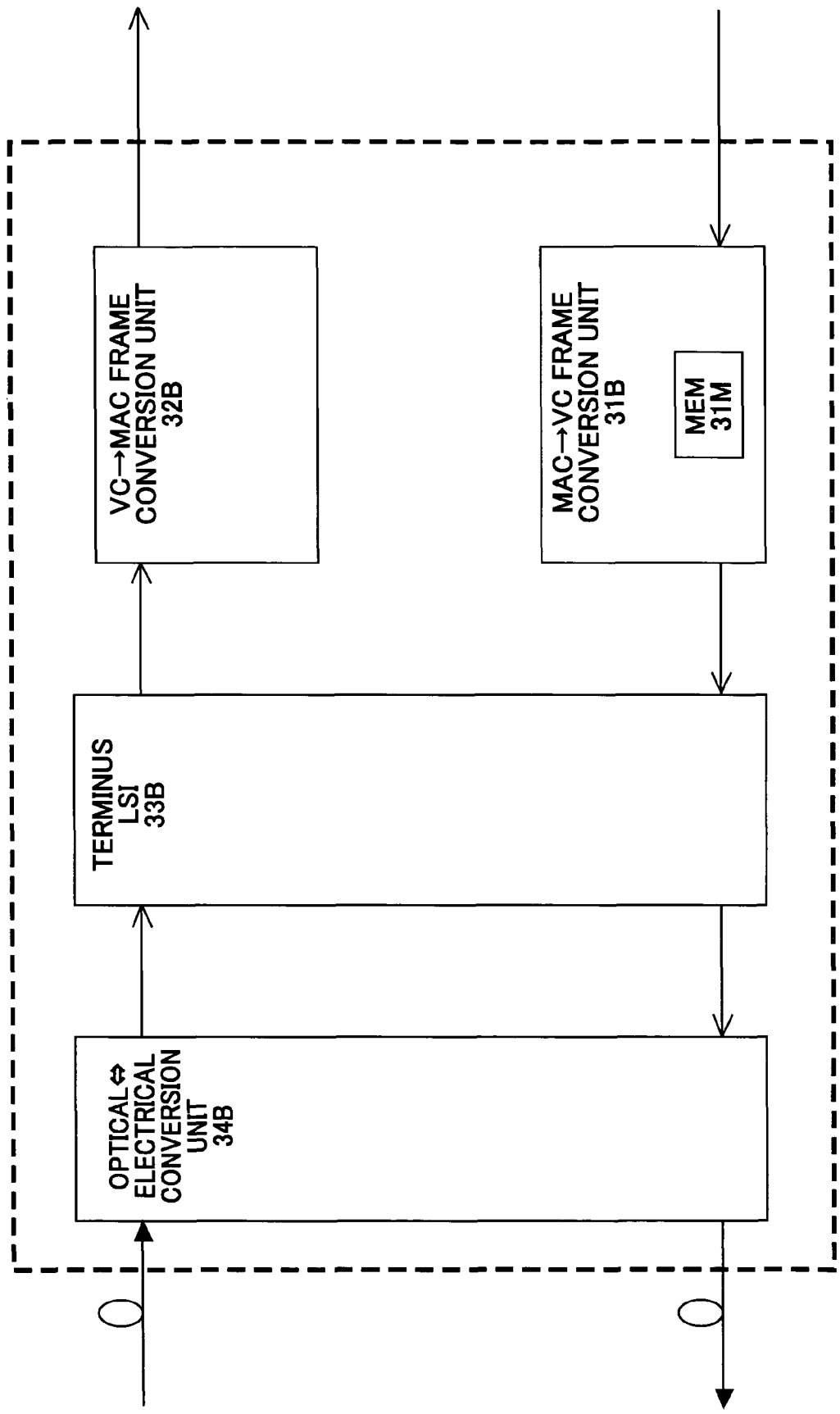
FIG. 13 shows a configuration example of a low-speed side interface 30.

FIG. 13 shows a configuration example of a low-speed side interface 30. Specifically, similarly to the third configuration example, this is a configuration example of a low-speed interface 30B for synchronous communication in which a packet switch 20A performs switching of both synchronous data and asynchronous data. The low-speed interface 30B comprises a MAC→VC frame conversion unit 31B, which converts MAC frames into VC frames; a VC→MAC frame conversion unit 32B, which converts VC frames into MAC addresses; a terminus LSI 33B; and an optical-electrical conversion unit 34B. The MAC→VC frame conversion unit 31B must combine packets (MAC frames) received from the packet switch 20A and convert the data into the original synchronous data frames; but because the MAC frames are processed asynchronously by the packet switch 20A and are sent with a timing that is not constant, fluctuations occur in the delay with which MAC frames are received by the low-speed interface 31B. Hence the MAC→VC frame conversion unit 31B has a buffer memory 31M to absorb such delay fluctuations, and can synchronize and output, with prescribed clock timing, synchronous data which has been restored to VC frames.

Figure 14:
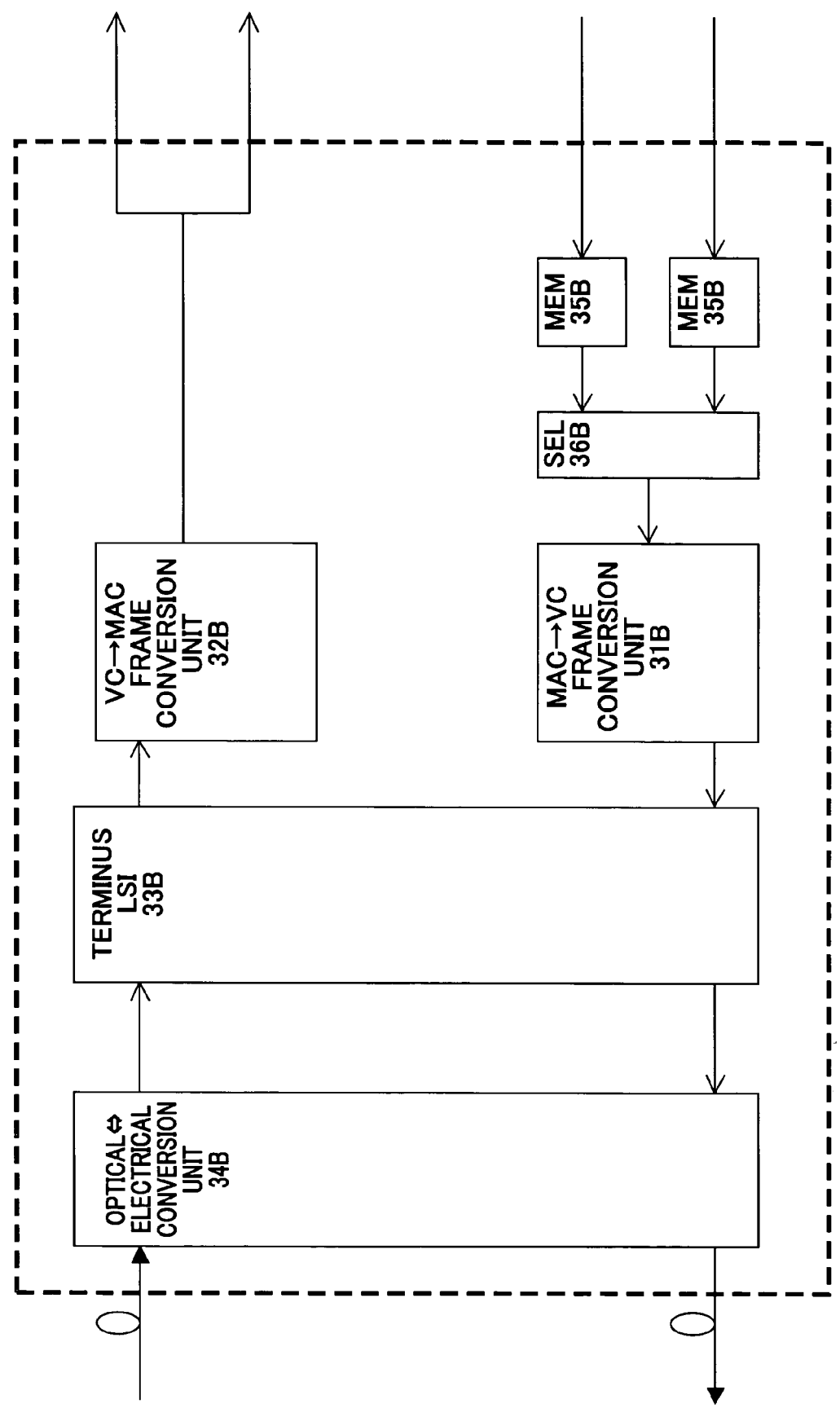
FIG. 14 shows another configuration example of a low-speed side interface 30.

FIG. 14 shows another configuration example of a low-speed side interface 30. In the redundant configurations shown in FIG. 10 through FIG. 12, data flows into the low-speed interface 30B from two packet switches 20A, for system 0 and system 1. In synchronous communication, there are cases in which particularly important circuits are required to have hitless switching functions based on a redundant configuration. A hitless switching function is a function which performs instantaneous switching to the other side without communication interruption, even when a communication interruption occurs on one side. In order to implement a hitless switching function, memory to absorb phase differences in order to match the phases of data in system 0 and system 1 is necessary.

In FIG. 14, two memory units 35B are memory used in hitless switching; the selector 36B selects data from one side and sends the data to the MAC→VC frame conversion unit 31B. In the configuration example of FIG. 14, this hitless switching memory 35B can be provided with a function to absorb fluctuations in the delay of MAC frames. By this means, the need to add new memory to the MAC→VC frame conversion unit 31B is eliminated, and the MAC→VC frame conversion 31B can be made smaller.

Further, in a hitless path configuration for redundant synchronous data signals, a configuration may be employed in which, when relaying signals to the shorter path, synchronous data is intentionally transferred so as to pass through a packet switch, while the data on the longer path is passed straight through, to adjust delay amounts and reduce the required hitless memory capacity of the reception unit (in this case, tags are allocated so as to comprise information indicating that the data is synchronous data and to indicate whether the data passes through the switch).

What is claimed is:

1. A transmission system receiving from a node on a transmission path multiplexed data in which synchronous data and asynchronous data are multiplexed and unified as frames of the asynchronous data, comprising:
  a packet switch switching asynchronous data which is a MAC frame; and
  a straight-through processing unit extracting a tag from each item of demultiplexed data, the tag including destination information and type information to identify whether each item of the demultiplexed data is synchronous data or asynchronous data, determining whether each item of the demultiplexed data is first data which is synchronous data and is not addressed to said packet switch, based on the type information included in the tag, transmitting the first data to the node of said transmission path, and transferring second data other than the first data to said packet switch, the second data including synchronous data which is addressed to the packet switch.

2. The transmission system according to claim 1, wherein said packet switch processes, with priority, data which is synchronous data and is said second data, and which is addressed to said packet switch.

3. The transmission system according to claim 1, comprising a frame conversion unit converting synchronous data, output from said packet switch to a low-speed interface side, from frames of asynchronous data into frames of synchronous data, wherein
  said frame conversion unit has memory which absorbs delay fluctuations of synchronous data output from said packet switch.

4. The transmission system according to claim 3, wherein said memory is common with hitless switching memory provided in said low-speed interface.

5. The transmission system according to claim 1, wherein, when a plurality of said packet switches are provided for network redundancy, or when said packet switches are divided, a bridge processing unit to transfer data from one packet switch to another packet switch is provided, and wherein data transmission is performed between said packet switch and said straight-through processing unit via said bridge processing unit.

* * * * *